US008404344B2

(12) United States Patent
Ukei et al.

(10) Patent No.: US 8,404,344 B2
(45) Date of Patent: Mar. 26, 2013

(54) PRESSURE SENSITIVE ADHESIVE COMPOSITION, PRESSURE SENSITIVE ADHESIVE SHEET AND SURFACE PROTECTIVE FILM

(75) Inventors: Natsuki Ukei, Osaka (JP); Tatsumi Amano, Osaka (JP); Masahiko Ando, Osaka (JP); Takeshi Sutou, Osaka (JP)

(73) Assignee: Nitto Denko Corporation, Osaka (JP)

( * ) Notice: Subject to any disclaimer, the term of this patent is extended or adjusted under 35 U.S.C. 154(b) by 834 days.

(21) Appl. No.: 11/914,939

(22) PCT Filed: May 16, 2006

(86) PCT No.: PCT/JP2006/309712
§ 371 (c)(1),
(2), (4) Date: Nov. 19, 2007

(87) PCT Pub. No.: WO2006/123638
PCT Pub. Date: Nov. 23, 2006

(65) Prior Publication Data
US 2009/0029162 A1    Jan. 29, 2009

(30) Foreign Application Priority Data

May 20, 2005 (JP) ................................. 2005-148279

(51) Int. Cl.
| | |
|---|---|
| B32B 7/12 | (2006.01) |
| C09D 5/00 | (2006.01) |
| C08L 33/10 | (2006.01) |
| C08K 5/36 | (2006.01) |
| C08K 5/16 | (2006.01) |
| C08K 5/3432 | (2006.01) |
| C08K 5/3445 | (2006.01) |

(52) U.S. Cl. ............. 428/355 AC; 428/343; 428/355 R; 428/356; 524/81; 524/95; 524/99; 524/104; 524/560

(58) Field of Classification Search ................... 428/343
See application file for complete search history.

(56) References Cited

U.S. PATENT DOCUMENTS
(Continued)

FOREIGN PATENT DOCUMENTS
| | | |
|---|---|---|
| CN | 1492902 | 4/2004 |
| CN | 1561364 | 1/2005 |

(Continued)

OTHER PUBLICATIONS

Brochure regarding "Functional Chemicals" published by Kyoeisha Chemical Co., Ltd., printed and published in May 2003, front page, pp. 11-12, 19-20 and back page.

(Continued)

*Primary Examiner* — David Sample
*Assistant Examiner* — Jeff Vonch
(74) *Attorney, Agent, or Firm* — Knobbe Martens Olson & Bear, LLP

(57) ABSTRACT

A pressure-sensitive adhesive composition characterized by comprising a water-dispersible (meth)acryl-based polymer containing, as a monomer component, 50 to 99.9% by weight of a (meth)acrylate having an alkyl group with a carbon number of 1 to 14, and an ionic liquid. There is provided a pressure-sensitive adhesive composition that attains static charge prevention at peeling between pressure sensitive adhesive layer and adherend not rendered antistatic, thereby reducing contamination of the adherend. Also, there are provided, making use of the same, an antistatic pressure sensitive adhesive sheet and surface protective film.

20 Claims, 1 Drawing Sheet

Schematic view of an electrostatic measuring part

U.S. PATENT DOCUMENTS

| | | | |
|---|---|---|---|
| 3,492,276 A | 1/1970 | Smith | |
| 4,145,327 A | 3/1979 | Dolch et al. | |
| 4,313,978 A | 2/1982 | Stevens et al. | |
| 5,183,841 A | 2/1993 | Bernard | |
| 5,296,627 A | 3/1994 | Tang et al. | |
| 5,433,892 A | 7/1995 | Czech | |
| 5,631,079 A * | 5/1997 | Gutman et al. | 428/327 |
| 5,885,678 A | 3/1999 | Malhotra | |
| 5,952,398 A | 9/1999 | Dietz et al. | |
| 6,028,132 A | 2/2000 | Hayashi | |
| 6,103,316 A | 8/2000 | Tran et al. | |
| 6,245,847 B1 | 6/2001 | Green et al. | |
| 6,372,829 B1 | 4/2002 | Lamanna et al. | |
| 6,407,788 B1 * | 6/2002 | Okumura et al. | 349/122 |
| 6,518,342 B1 | 2/2003 | Tanaka et al. | |
| 6,562,428 B1 | 5/2003 | Ohrui | |
| 6,596,375 B2 | 7/2003 | Murata et al. | |
| 6,657,011 B2 | 12/2003 | Lau et al. | |
| 6,706,920 B2 | 3/2004 | Lamanna et al. | |
| 6,939,911 B2 | 9/2005 | Tosaki et al. | |
| 7,491,758 B2 | 2/2009 | Amano et al. | |
| 7,691,925 B2 * | 4/2010 | Amano et al. | 524/99 |
| 7,799,853 B2 * | 9/2010 | Ukei et al. | 524/99 |
| 7,842,742 B2 | 11/2010 | Amano et al. | |
| 7,846,999 B2 | 12/2010 | Amano et al. | |
| 7,989,525 B2 * | 8/2011 | Amano et al. | 524/86 |
| 2001/0031835 A1 | 10/2001 | Ohrui et al. | |
| 2001/0041763 A1 | 11/2001 | Suzuki et al. | |
| 2002/0132111 A1 | 9/2002 | Zhou et al. | |
| 2002/0137825 A1 | 9/2002 | Lamanna et al. | |
| 2003/0017330 A1 | 1/2003 | Okochi et al. | |
| 2003/0114560 A1 * | 6/2003 | Yang et al. | 524/154 |
| 2003/0122997 A1 | 7/2003 | Noh et al. | |
| 2004/0054041 A1 * | 3/2004 | Schmidt | 524/99 |
| 2005/0025903 A1 | 2/2005 | Fink et al. | |
| 2005/0080195 A1 | 4/2005 | Iwama | |
| 2005/0197450 A1 | 9/2005 | Amano et al. | |
| 2005/0266238 A1 | 12/2005 | Amano et al. | |
| 2006/0024494 A1 | 2/2006 | Amano et al. | |
| 2006/0100323 A1 | 5/2006 | Schmidt et al. | |
| 2006/0156481 A1 | 7/2006 | Lim | |
| 2006/0188711 A1 | 8/2006 | Kishioka et al. | |
| 2006/0207722 A1 | 9/2006 | Amano et al. | |
| 2006/0217515 A1 | 9/2006 | Getman et al. | |
| 2006/0223962 A1 | 10/2006 | Getman et al. | |
| 2007/0141329 A1 | 6/2007 | Yang et al. | |
| 2007/0149650 A1 | 6/2007 | Masuda | |
| 2008/0176976 A1 | 7/2008 | Amano et al. | |
| 2009/0163626 A1 | 6/2009 | Ukei et al. | |
| 2009/0317635 A1 | 12/2009 | Amano et al. | |

FOREIGN PATENT DOCUMENTS

| | | |
|---|---|---|
| EP | 0 435 080 | 7/1991 |
| EP | 0 684 295 | 11/1995 |
| EP | 0 873 986 | 10/1998 |
| EP | 0 919 603 | 6/1999 |
| EP | 1 102 108 | 5/2001 |
| EP | 1 491 604 | 12/2004 |
| EP | 1 548 750 | 6/2005 |
| EP | 1 574 557 | 9/2005 |
| EP | 1 582 573 | 10/2005 |
| EP | 1 591 506 | 11/2005 |
| EP | 1 595 929 | 11/2005 |
| EP | 1 602 698 | 12/2005 |
| EP | 1 621 596 | 2/2006 |
| EP | 1 693 430 | 8/2006 |
| GB | 2121061 | 12/1983 |
| JP | 55-086860 | 7/1980 |
| JP | 59-226076 | 12/1984 |
| JP | 61-138901 | 6/1986 |
| JP | 4-309585 | 11/1992 |
| JP | 5-009449 | 1/1993 |
| JP | 6-051121 | 2/1994 |
| JP | 6-128539 | 5/1994 |
| JP | 9-157618 | 6/1997 |
| JP | 9-165460 | 6/1997 |
| JP | 9-208910 | 8/1997 |
| JP | 10-231325 | 9/1998 |
| JP | 10-298539 | 11/1998 |
| JP | 11-256116 | 9/1999 |
| JP | 11-349910 | 12/1999 |
| JP | 2000-129235 | 5/2000 |
| JP | 2000-191991 | 7/2000 |
| JP | 2000-273417 | 10/2000 |
| JP | 2001-209039 | 8/2001 |
| JP | 2001-318230 | 11/2001 |
| JP | 2002-022960 | 1/2002 |
| JP | 2002-356662 | 12/2002 |
| JP | 2002-544364 | 12/2002 |
| JP | 2003-511505 | 3/2003 |
| JP | 2003-195044 | 7/2003 |
| JP | 2003-202722 | 7/2003 |
| JP | 2003-268334 | 9/2003 |
| JP | 2003-294951 | 10/2003 |
| JP | 2003-320631 | 11/2003 |
| JP | 2003-327933 | 11/2003 |
| JP | 2003-342483 | 12/2003 |
| JP | 2004-135167 | 4/2004 |
| JP | 2004-517185 | 6/2004 |
| JP | 2004-217931 | 8/2004 |
| JP | 2004-237515 | 8/2004 |
| JP | 2004-256789 | 9/2004 |
| JP | 2004-287199 | 10/2004 |
| JP | 2004-536940 | 12/2004 |
| JP | 2005-15524 | 1/2005 |
| JP | 2005-105228 | 4/2005 |
| JP | 2005-113128 | 4/2005 |
| JP | 2005-206776 | 8/2005 |
| JP | 2008-534714 | 8/2008 |
| TW | 200516124 | 5/2005 |
| WO | WO 97/08260 | 3/1997 |
| WO | WO 9708260 A1 * | 3/1997 |
| WO | WO 98/36005 | 8/1998 |
| WO | WO 00/24839 | 5/2000 |
| WO | WO 00/69985 | 11/2000 |
| WO | WO 01/25326 | 4/2001 |
| WO | WO 02/13980 | 2/2002 |
| WO | WO 02/053636 | 7/2002 |
| WO | WO 03/011958 | 2/2003 |
| WO | WO 03/068280 | 8/2003 |
| WO | WO 03/085050 | 10/2003 |
| WO | WO 03/099953 | 12/2003 |
| WO | WO 2004/005391 | 1/2004 |
| WO | WO 2004/027788 | 4/2004 |
| WO | WO 2004/065523 | 8/2004 |
| WO | WO 2005/061627 | 7/2005 |

OTHER PUBLICATIONS

European Office Action issued on the related European Patent Application No. EP05016102.5, dated Apr. 16, 2007.
European Search Report issued on the related European Patent Application No. EP05011720.9, dated Sep. 30, 2005.
European Search Report issued on the related European Patent Application No. EP05016102.5, dated Dec. 29, 2005.
European Search Report issued on the related European Patent Application No. EP06110235.6, dated May 25, 2007.
Search Report issued on the related European Patent Application No. EP05004925, dated Oct. 24, 2005.
European Search Report issued on the related European Patent Application No. EP06111107, dated Jun. 27, 2006.
European Search Report issued on the related European Patent Application No. 05005660, dated Jun. 30, 2005.
European Search Report issued on the related European Patent Application No. 05020138, dated Nov. 28, 2005.
European Search Report issued on the related European Patent Application No. 05009331, dated Jul. 22, 2005.
European Search Report issued on the related European Patent Application No. 05004925, dated Aug. 19, 2005.
European Search Report issued on the related European Patent Application No. 05020102, dated Nov. 29, 2005.
European Search Report issued on the related European Patent Application No. 05010330, dated Sep. 19, 2005.
European Search Report issued on the related European Patent Application No. 05015766, dated Nov. 4, 2005.

European Search Report issued on the related European Patent Application No. 05016102, dated Nov. 8, 2005.
File History of the related U.S. Appl. No. 11/073,456, as of Apr. 3, 2008.
File History of the related U.S. Appl. No. 11/141,590, as of Apr. 3, 2008.
File History of the related U.S. Appl. No. 11/188,561, as of Apr. 3, 2008.
File History of the related U.S. Appl. No. 11/358,808, as of Apr. 3, 2008.
File History of the related U.S. Appl. No. 11/375,963, as of Apr. 3, 2008.
File History of the related U.S. Appl. No. 12/065,652, as of Apr. 3, 2008.
File History of the related U.S. Appl. No. 12/052,951, as of Apr. 3, 2008.
Information Supplement filed on the related Japanese Patent Application No. 2005-26704, dated May 14, 2007.
International Search Report issued on the related PCT Application No. PCT/JP2006/317522, dated Dec. 12, 2006.
Partial European Search Report issued on the related European Patent Application No. EP05016102, dated Nov. 8, 2005.
Peter Wasserscheid et al., "Ionic Liquids—New "Solutions" for Transition Metal Catalysis," Angewandte Chemie. International Edition, Verlag Chemie. Weinheim, Germany, vol. 39, No. 21, Nov. 3, 2000.
Hans-Georg Elias: "Makromoleküle Band 1 Grundlagen Struktur-Synthese-Eigenschaften", Hüthig & Wepf Verlag, Basel Heidelberg New York, pp. 845-857 (1990).
M.D. Lechner, K. Gehrke, E.H. Nordmeier: "Makromolekulare Chemie-Ein Lehrbuch für Chemiker, Physiker, Materialwissenschaftler und Verfahrenstechniker" Birkhäuser Verlag, Basel Boston Berlin, pp. 295-299 (1996).
File History of the related U.S. Appl. No. 11/073,456, for the period of Apr. 4, 2008-Jul. 20, 2010.
File History of the related U.S. Appl. No. 11/141,590, for the period of Apr. 4, 2008-Jul. 20, 2010.
File History of the related U.S. Appl. No. 11/188,561, for the period of Apr. 4, 2008-Jul. 20, 2010.
File History of the related U.S. Appl. No. 11/375,963, for the period of Apr. 4, 2008-Jul. 20, 2010.
File History of the related U.S. Appl. No. 12/065,652, for the period of Apr. 4, 2008-Jul. 20, 2010.
File History of the related U.S. Appl. No. 12/052,951, for the period of Apr. 4, 2008-Jul. 20, 2010.
File History of the related U.S. Appl. No. 12/548,318, as of Jul. 20, 2010.

International Search Report issued on the corresponding PCT Application No. PCT/JP2006/309712, dated Jun. 20, 2006.
"Polyacrylate" In: Jürgen Falbe, Manfred Regitz: "Römpp Chemie Lexikon", 1992, Georg Thieme Verlag, Stuttgart New York, pp. 3506-3507.
Rudolf Riesen et al.: "Die Glasübergangtemperatur gemessen mit verschiedenen TA-Techniken, Teil 2: Ermittlung der Glasübergangstemperaturen", Usercom Informationen Fur Anwender Von Mettler Toledo Thermoanalysen-Systemen, [Online] No. 18, Feb. 2003, pp. 1-20, XP002594785, Retrieved from the Internet: URL: http://de.mt.com/global/de/home/supportive_content/usercom/TA_UserCom18.z2vUzjpy0vKAxrVCMLHBfbHCI45nAzOnG-.MediaFileComponent.html/tausercl8d.pdf> [retrieved on Feb. 1, 2003].
File History of the related U.S. Appl. No. 11/188,561, for the period of Jul. 21, 2010-Feb. 23, 2011.
File History of the related U.S. Appl. No. 12/065,652, for the period of Jul. 21, 2010-Feb. 23, 2011.
File History of the related U.S. Appl. No. 12/052,951, for the period of Jul. 21, 2010-Feb. 23, 2011.
File History of the related U.S. Appl. No. 12/548,318, for the period of Jul. 21, 2010-Feb. 23, 2011.
Office Action issued by the Japanese Patent Office dated Sep. 1, 2011 for the corresponding Japanese Patent Application No. 2006-135265.
Erich Penzel et al., "Some properties of copolymers of vinylidense chloride with acrylates and methacrylates, Part 1", Angewandte Makromolekulare Chemie. Applied Macromolecularchemistry and Physics, Wiley VCH, Weinheim, DE, vol. 273, No. 4703, Jan. 1, 1999, pp. 15-27.
"Katalog Handbuch Felnchemikallen, product No. 18,206-0", Jan. 1, 1999, Katalog Handbuch Feinchemikalien, Aldrich, pp. 1588.
Zimmertemperatur in: Jurgen Falbe, Manfred Regitz: Rompp Chemie Lexikon, 1992, Georg Thieme Verlag, Stuttgart, New York, p. 5132.
Chemistry Handbook Basic Edition I, Maruzen Kabushikikaisha, 1985, pp. 456-457, 460-461.
Notification of Reasons for Refusal issued by the Japanese Patent Office dated Aug. 2, 2012 for the corresponding Japanese Patent Application No. 2006-135265.
Examination Report issued in the corresponding Taiwanese patent application No. 095117580, dated Jul. 6, 2012.
Notice of Preliminary Rejection dated Sep. 26, 2012 in corresponding Korean patent application No. 10-2007-7029596.

* cited by examiner

Schematic view of an electrostatic measuring part

Schematic view of an electrostatic measuring part

PRESSURE SENSITIVE ADHESIVE COMPOSITION, PRESSURE SENSITIVE ADHESIVE SHEET AND SURFACE PROTECTIVE FILM

This application is the U.S. National Phase under 35 U.S.C. §371 of International Application No. PCT/JP2006/309712, filed May 16, 2006, which claims priority to the Japanese Patent Application No. 2005-148279, filed May 20, 2005. The International Application was not published in English under PCT Article 21(2).

BACKGROUND OF THE INVENTION

1. Field of the Invention

The present invention relates to a pressure-sensitive adhesive composition having antistatic property, and pressure-sensitive adhesive sheets and a surface protecting film obtained by formulating into a form of a sheet or a tape using the composition.

2. Description of the Related Art

Pressure-sensitive sheets comprising an antistatic pressure-sensitive adhesive composition of the present invention is suitably used in plastic products on which static electricity is easily generated. Above all, particularly, the pressure-sensitive adhesive sheet is useful as antistatic pressure-sensitive adhesive sheet and surface protecting film used for avoiding static electricity in an electronic instrument and the like.

A surface protecting film is generally stuck to subject to be protected with pressure-sensitive adhesive applied on the side of the protecting film, and used for the purpose of preventing scratches or staining caused during processing and conveyance of the subject to be protected. For example, a liquid crystal display panel is formed by sticking optical members such as a polarizing plate and a wavelength plate to a liquid crystal cell with pressure-sensitive adhesive. The protecting film is stuck to these optical members stuck to the liquid crystal cell with pressure-sensitive adhesive for the purpose of preventing scratches, staining and the like.

Then, the protecting film is removed by peeling off at the stage when the protecting film becomes unnecessary, for example, this optical member is stuck to the liquid crystal cell. Generally, the protecting film and the optical member are composed of plastic materials, so that electrical insulating property is high and static electricity is caused during friction and peeling off. Accordingly, also when the protecting film is peeled off from the subject to be protected, static electricity is caused to result in deterioration of workability and damage of the subject to be protected. Thus, in order to prevent such defects, various antistatic treatments are applied to the surface protecting film.

For example, a method of preventing electrification by adding one kind or more of a surfactant to pressure-sensitive adhesive to transfer the surfactant from the pressure-sensitive adhesive to an adherend is disclosed (for example, refer to Patent Literature 1). However, with regard to this invention, the surfactant bleeds on the surface of the pressure-sensitive adhesive so easily that staining on the adherend is concerned in the case of applying to the protecting film.

Also, a method of adding an antistatic agent comprising polyether polyol and an alkali metal salt to acrylic pressure-sensitive adhesive to restrain the antistatic agent from bleeding on the surface of the pressure-sensitive adhesive is disclosed (for example, refer to Patent Literature 2). However, bleeding of the antistatic agent can not be avoided also in this method; consequently, in the case of actually applying to the surface protecting film, it has proved that treatment with time and under high temperature causes staining on the adherend due to the bleeding phenomenon.

On the other hand, pressure-sensitive adhesive using no organic solvent has been demanded in recent years from the viewpoint of environmental measures, resources saving and safety.

Patent Literature 1: Japanese Unexamined Patent Publication No. 9-165460

Patent Literature 2: Japanese Unexamined Patent Publication No. 6-128539

SUMMARY OF THE INVENTION

In view of such circumstances, the present invention is intended to provide a pressure-sensitive adhesive composition, in which antistatic property of a pressure-sensitive adhesive layer and an adherend to which antistatic treatment is not applied is intended upon peeling off and staining on the adherend is reduced, an antistatic pressure-sensitive adhesive sheet and a surface protecting film, using this composition.

SUMMARY OF THE INVENTION

In order to solve the aforementioned problems, the present inventors intensively studied and, as a result, found out that the aforementioned object can be attained by a pressure-sensitive adhesive composition shown below, which resulted in completion of the present invention.

A pressure-sensitive adhesive composition of the present invention is characterized by comprising a water-dispersible (meth)acryl-based polymer containing, as a monomer component, 50 to 99.9% by weight of a (meth)acrylate having an alkyl group with a carbon number of 1 to 14, and an ionic liquid.

The ionic liquid in the present invention refers to a melt salt (ionic compound) exhibiting the liquid state at room temperature (25° C.).

As shown in the results of the examples, a pressure-sensitive adhesive composition of the present invention contains, as a base polymer, a water-dispersible (meth)acryl-based polymer containing, as a monomer component, 50 to 99.9% by weight of a (meth)acrylate having an alkyl group with a carbon number of 1 to 14, and further contains an ionic liquid, so that a pressure-sensitive adhesive layer obtained by crosslinking this composition offers reduced staining property on a subject to be protected (an adherend), and is excellent in antistatic property of the pressure-sensitive adhesive layer and the adherend to which antistatic treatment is not applied upon peeling off. The details of the reason why a crosslinking substance of the above-mentioned water-dispersible (meth)acryl-based polymer and ionic liquid develops such property are not obvious and yet it is presumed that the ionic liquid exhibits excellent electrical conductivity by oneself that even a very small amount thereof allows sufficient antistatic performance and reduces staining.

The above-mentioned ionic liquid can easily be added and dispersed or dissolved in the pressure-sensitive adhesive as compared with a solid salt by reason of being in a liquid state at room temperature. In addition, the ionic liquid never vanishes with time by reason of having no vapor pressure (non-volatility), so that antistatic property is continuously obtained.

A pressure-sensitive adhesive composition of the present invention uses, as a base polymer, a water-dispersible (meth)acryl-based polymer containing a monomer, 50 to 99.9% by weight of a (meth)acrylate having an alkyl group with a carbon number of 1 to 14.

A (meth)acryl-based polymer in the present invention refers to an acryl-based polymer and/or a methacryl-based polymer. An alkyl(meth)acrylate refers to an alkyl acrylate and/or an alkyl methacrylate, and a (meth)acrylate refers to an acrylate and/or a methacrylate.

A water-dispersible (meth)acryl-based polymer in the present invention refers to a (meth)acryl-based polymer of a water dispersion obtained by subjecting to emulsion polymerization a monomer blend having, as a monomer component, 50 to 99.9% by weight of a (meth)acrylate having an alkyl group with a carbon number of 1 to 14. The use of these (meth)acryl-based polymers as a base polymer brings a favorable balance of compatibility between the ionic liquid and the base polymer, so that adhesive property can sufficiently be maintained to further allow a water-dispersible pressure-sensitive adhesive composition.

Even though applied on an ordinary dry polymer film, the pressure-sensitive adhesive composition has the advantage that the dry polymer film is not swollen and dissolved by reason of using no organic solvent, which pressure-sensitive adhesive composition can further meet the demand that a pressure-sensitive adhesive composition using no organic solvent be preferably used in view of environmental friendliness in recent years.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (D). By an ionic liquids having these cations, further excellent antistatic ability is obtained.

[Chemical formula 1]

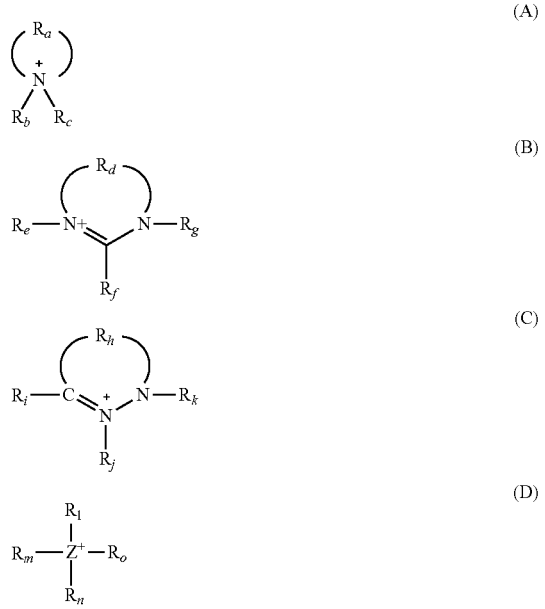

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

In addition, it is preferable that a water-soluble ionic liquid is used as an ionic liquid in the present invention. The use of the water-soluble ionic liquid allows more favorable compatibility to be realized with the above-mentioned water-dispersible (meth)acryl-based polymer.

On the other hand, a pressure-sensitive adhesive layer of the present invention is characterized by comprising the above-mentioned pressure-sensitive adhesive composition crosslinked. A pressure-sensitive adhesive sheet more excellent in heat resistance and weather resistance can be obtained by crosslinking while properly adjusting constitutional unit, structural ratio, selection of a crosslinking agent and addition ratio of the above-mentioned (meth)acryl-based polymer.

A pressure-sensitive adhesive sheet of the present invention is characterized by forming on a support a pressure-sensitive adhesive layer comprising the pressure-sensitive adhesive composition described in any of the above crosslinked. A pressure-sensitive adhesive sheet of the present invention becomes a pressure-sensitive adhesive sheet, in which antistatic property of a pressure-sensitive adhesive layer and an adherend to which antistatic treatment is not applied is intended upon peeling off and staining property on the adherend is reduced, by reason of being provided with the pressure-sensitive adhesive layer comprising the pressure-sensitive adhesive composition for producing the above-mentioned function and effect crosslinked. A pressure-sensitive adhesive sheet of the present invention includes a pressure-sensitive adhesive tape, a pressure-sensitive adhesive film and the like.

Further, when the pressure-sensitive adhesive composition of the present invention is applied to a surface protecting film, it is preferable that a plastic substrate used in a protecting film is antistatic-treated. An antistatic treatment is applied to a plastic substrate, so that peeling electrification voltage of the adherend can be reduced more efficiently to further allow excellent antistatic performance.

BEST MODE FOR CARRYING OUT THE INVENTION

Figure 1:
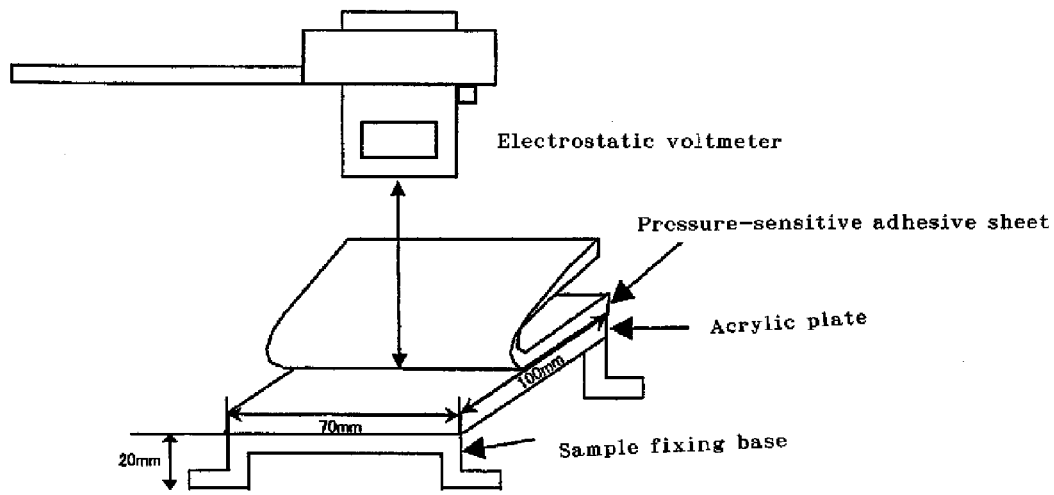
FIG. 1 is a schematic construction view of an electrostatic measuring part used for measuring a peeling electrification voltage in Examples.

The embodiments of the present invention are hereinafter described in detail.

A pressure-sensitive adhesive composition of the present invention is characterized by comprising a water-dispersible (meth)acryl-based polymer containing, as a monomer component, 50 to 99.9% by weight of a (meth)acrylate having an alkyl group with a carbon number of 1 to 14, and an ionic liquid.

The ionic liquid in the present invention refers to a melt salt (ionic compound) exhibiting the liquid state at room temperature (25° C.).

As the ionic liquid, a nitrogen-containing onium salt, a sulfur-containing onium salt or a phosphorus-containing onium salt is preferably used. In particular, since excellent antistatic ability is obtained, an ionic liquid comprising an organic cation component represented by the following general formulas (A) to (D), and an anion component is preferably used.

[Chemical formula 2]

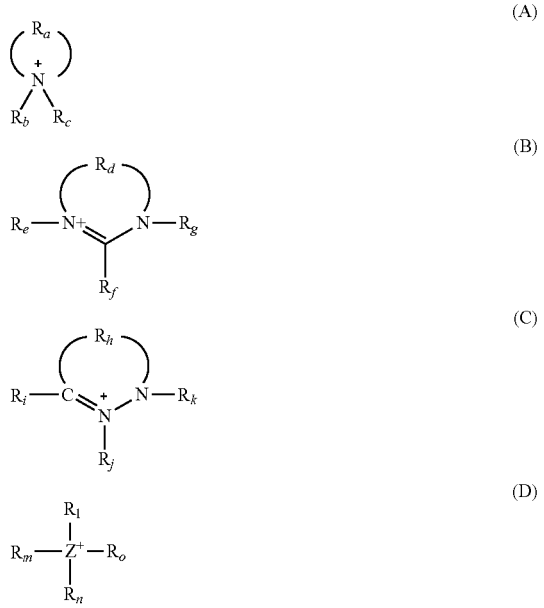

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

Examples of the cation represented by the formula (A) include a pyridinium cation, a piperidinium cation, a pyrrolidinium cation, a cation having a pyrroline skeleton, and a cation having a pyrrole skeleton.

Specific examples thereof include a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-methyl-1-ethylpyrrolidinium cation, a 1-methyl-1-propylpyrrolidinium cation, a 1-methyl-1-butylpyrrolidinium cation, a 1-methyl-1-pentylpyrrolidinium cation, a 1-methyl-1-hexylpyrrolidinium cation, a 1-methyl-1-heptylpyrrolidinium cation, a 1-ethyl-1-propylpyrrolidinium cation, a 1-ethyl-1-butylpyrrolidinium cation, a 1-ethyl-1-pentylpyrrolidinium cation, a 1-ethyl-1-hexylpyrrolidinium cation, a 1-ethyl-1-heptylpyrrolidinium cation, a 1,1-dipropylpyrrolidinium cation, a 1-propyl-1-butylpyrrolidinium cation, a 1,1-dibutylpyrrolidinium cation, a 1-propylpiperidinium cation, a 1-pentylpiperidinium cation, a 1,1-dimethylpiperidinium cation, a 1-methyl-1-ethylpiperidinium cation, a 1-methyl-1-propylpiperidinium cation, a 1-methyl-1-butylpiperidinium cation, a 1-methyl-1-pentylpiperidinium cation, a 1-methyl-1-hexylpiperidinium cation, a 1-methyl-1-heptylpiperidinium cation, a 1-ethyl-1-propylpiperidinium cation, a 1-ethyl-1-butylpiperidinium cation, a 1-ethyl-1-pentylpiperidinium cation, a 1-ethyl-1-hexylpiperidinium cation, a 1-ethyl-1-heptylpiperidinium cation, a 1,1-dipropylpiperidinium cation, a 1-propyl-1-butylpiperidinium cation, a 1-butyl-1-pentylpiperidinium cation, a 1-butyl-1-hexylpiperidinium cation, a 1-butyl-1-heptylpiperidinium cation, a 1,1-dibutylpiperidinium cation, a 2-methyl-1-pyrroline cation, a 1-ethyl-2-phenylindole cation, a 1,2-dimethylindole cation and a 1-ethylcarbazole cation.

Examples of the cation represented by the formula (B) include an imidazolium cation, a tetrahydropyrimidinium cation, and a dihydropyrimidinium cation.

Specific examples include a 1,3-dimethylimidazolium cation, a 1,3-diethylimidazolium cation, a 1-ethyl-3-methylimidazolium cation, a 1-butyl-3-methylmidazolium cation, a 1-hexyl-3-methylimidazolium cation, a 1-ocytl-3-methylimidazolium cation, a 1-decyl-3-methylimidazolium cation, a 1-dodecyl-3-methylimidazolium cation, a 1-tetradecyl-3-methylimidazolium cation, a 1-hexadecyl-3-methylimidazolium cation, a 1-octadecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihydropyrimidinium cation.

Examples of the cation represented by the formula (C) include a pyrazolium cation, and a pyrazolinium cation.

Specific examples thereof include a 1-methylpyrazolium cation, a 3-methylpyrazolium cation, a 1-ethyl-2,3,5-trimethylpyrazolium cation, a 1-propyl-2,3,5-trimethylpyrazolium cation, a 1-butyl-2,3,5-trimethylpyrazolium cation and a 1-ethyl-2-pyrazolinium cation.

Examples of the cation represented by the formula (D) include a tetraalkylammonium cation, a trialkylsulfonium cation, a tetraalkylphosphonium cation, and those cations in which a part of the alkyl group is substituted with an alkenyl group, an alkoxyl group, or an epoxy group.

Specific examples include a tetramethylammonium cation, a tetraethylammonium cation, a tetrapropylammonium cation, a tetrabutylammonium cation, a tetrapentylammonium cation, a tetrahexylammonium cation, a tetraheptylammonium cation, a triethylmethylammonium cation, a tributylethylammonium cation, a trimethyldecylammonium cation, a trioctylmethylammonium cation, a tripentylbutylammonium cation, a trihexylmethylammonium cation, a trihexylpentylammonium cation, a triheptylmethylammonium cation, a triheptylhexylammonium cation, a N,N-diethyl-N-methyl-N-(2-methoxyethyl)ammonium cation, a glycidiyltrimethylammonium cation, diallyldimethylammonium cation, a N,N-dimethyl-N,N-dipropylammonium cation, a N,N-dimethyl-N,N-dihexylammonium cation, a N,N-dipropyl-N,N-dihexylammonium cation, a N,N-dimethyl-N-ethyl-N-propylammonium cation, a N,N-dimethyl-N-ethyl-N-butylammonium cation, a N,N-dimethyl-N-ethyl-N-pentylammonium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-propyl-N-butylammonium cation, a N,N-dimethyl-N-propyl-N-pentylammonium cation, a N,N-dimethyl-N-propyl-N-hexylammonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylammonium cation, a N,N-dimethyl-N-hexyl-N-heptylammonium cation, a trimethylheptylammonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-propyl-N-pentylammonium cation, a triethylmethylammonium cation, a triethylpropylammonium cation, a triethylpentylammonium cation, a triethylheptylammonium cation, a N,N-dipropyl-N-methyl-N-ethylammonium cation, a N,N-dipropyl-N-methyl-N-pentylammonium cation, a N,N-dipropyl-N-butyl-N-hexylammonium cation, a N,N-dibutyl-N-methyl-N-pentylammonium cation, a N,N-dibutyl-N-methyl-N-hexylammonium cation, a trioctylmethylammonium cation, a N-methyl-N-ethyl-N-propyl-N-pentylammonium cation, a trimethylsulfonium cation, a triethylsulfonium cation, a tributylsulfonium cation, a trihexylsulfonium cation, a diethylmethylsulfonium cation, a dibutylethylsulfonium cation, a dimethyldecylsulfonium cation, a tetramethylphosphonium cation, a tetraethylphosphonium cation, a tetrabutylphosphonium cation, a tetrapentylphosphonium cation, a tetrahexylphosphonium cation, a tetraheptylphosphonium cation, a traoctylphosphonium cation, a triethylmethylphosphonium cation, a tributylethylphosphonium cation, and a trimethyldecylphosphonium cation.

Inter alia, a tetraalkylammonium cation such as a triethylmethylammonium cation, a tributylethylammonium cation, a trimethyldecylammonium cation, a trioctylmethylammonium cation, a tripentylbutylammonium cation, a trihexylmethylammonium cation, a trihexylpentylammonium cation, a triheptylmethylammonium cation, a tripentylbutylammonium cation, a triheptylhexylammonium cation, a N,N-diethyl-N-methyl-N-(2-methoxyethyl)ammonium cation, a glycidyltrimethylammonium cation, a N,N-dimethyl-N-ethyl-N-propylammonium cation, a N,N-dimethyl-N-ethyl-N-butylammonium cation, a N,N-dimethyl-N-ethyl-N-pentylammonium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-hexyl-N-heptylammonium cation, a N,N-dimethyl-N,N-dihexylammonium cation, a N,N-dimethyl-N-propyl-N-butylammonium cation, a N,N-dimethyl-N-propyl-N-pentylammonium cation, a N,N-dimethyl-N-propyl-N-hexylammonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylamonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-propyl-N-pentylammonium cation, a triethylpropylammonium cation, a triethylpentylammonium cation, a triethylheptylammonium cation, a N,N-dipropyl-N-methyl-N-ethylammonium cation, a N,N-dipropyl-N-methyl-N-pentylammonium cation, a N,N-dipropyl-N-butyl-N-hexylammonium cation, a N,N-dipropyl-N,N-dihexylammonium cation, a N,N-dibutyl-N-methyl-N-pentylammonium cation, a N,N-dibutyl-N-methyl-N-hexylammonium cation, a trioctylmethylammonium cation, a N-methyl-N-ethyl-N-propyl-N-pentylammonium cation, a trialkylsulfonium cation such as a trimethylsulfonium cation, a triethylsulfonium cation, a tributylsulfonium cation, a trihexylsulfonium cation, a diethylmethylsulfonium cation, a dibutylethylsulfonium cation, and a dimethyldecylsulfonium cation, a tetraalkylphosphonium cation such as a tetramethylphosphonium cation, a tetraethylphosphonium cation, a tetrabutylphosphonium cation, a tetrapentylphosphonium cation, a tetrahexylphosphonium cation, a tetraheptylphosphonium cation, a tetraoctylphosphonium cation, a tributylethylphosphonium cation, a tributylethylphosphonium cation, and a trimethyldecylphosphonium cation are preferably used.

On the other hand, the anionic component is not particularly limited as far as it satisfies that it becomes an ionic liquid. Specifically, for example, $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, and $(CF_3SO_2)(CF_3CO)N^-$ are used. Among them, in particular, an anionic component containing a fluorine atom is preferably used because a low melting point ionic compound is obtained.

An embodiment of an ionic liquid used in the present invention is used by appropriately selecting from a combination of the aforementioned cation component and anion component.

Examples include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethaneslufonyl)imide, 1-butyl-3-methylpyridinium, bis(pentafluoroethanesulfonyl)imide, 1-hexylpyridinium tetrafluoroborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutane sulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethane sulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, glycidyltrimethylamonium trifluoromethanesulfonate, glycidyltrimethylamonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethane sulfonyl)trifluoroacetamide, N,N-diethyl-N-methyl-N-(2-methoxyethyl)ammonium (trifluoroethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, and N-methyl-N-ethyl-N-propyl-N-pentylammonium bis(trifluoromethanesulfonyl)imide.

An ionic liquid used for the present invention is properly selected from combinations of the above-mentioned cationic components and anionic components, and yet is preferably water-soluble.

Specific examples of the water-soluble ionic liquid include 1-ethyl-3-methylimidazolium hexafluorophosphate, 1-ethyl-3-methylimidazolium tetrafluoroborate, 1-ethyl-3-methylimidazolium trifluoromethanesulfonate, 1-butyl-3-methylimidazolium tetrafluoroborate, 1-butyl-3-methylimidazolium trifluoromethanesulfonate, 1-hexyl-3-methylimidazolium bromide, 1-hexyl-3-methylimidazolium chloride, 1-octyl-3-methylimidazolium chloride, 1-decyl-3-methylimidazolium chloride, 1-dodecyl-3-methylimidazolium chloride, 1-tetradecyl-3-methylimidazolium chloride, 1-hexadecyl-3-methylimidazolium chloride, 1-hexyl-2,3-dimethylimidazolium bromide, 1-hexyl-2,3-dimethylimidazolium chloride, 1-butylpyridinium trifluoromethanesulfonate, 1-hexylpyridinium bromide, 1-hexylpyridinium chloride and 1-butyl-3-methylpyridinium trifluoromethanesulfonate.

As the aforementioned ionic liquid, a commercially available ionic liquid may be used, or the liquid may be synthesized as described below.

A method of synthesizing an ionic liquid is not particularly limited as far as an objective ionic liquid is obtained. Generally, a halide method, a hydroxide method, an acid ester method, a chelate forming method, and a neutralization method described in the publication "Ionic liquid—The Front and Future of Development—" (published by CMC publishing CO., LTD) are used.

Regarding a halide method, a hydroxide method, an acid ester method, a chelate forming method, and a neutralization method, a synthesis method using an example of a nitrogen-containing onium salt will be shown below, but other ionic liquid such as a sulfur-containing onium salt, and a phosphorus-containing onium salt can be obtained by the similar procedure.

The halide method is a method which is performed by a reaction shown in the following formulas (1) to (3). First, a tertiary amine and alkyl halide are reacted to obtain halide (Reaction Equation (1), as a halogen, chlorine, bromine or iodine is used).

The resulting halide is reacted with an acid (HA) having an anion structure ($A^-$) of an objective ionic liquid or a salt (MA, M is a cation forming a salt with an objective anion such as ammonium, lithium, sodium and potassium) of an objective ionic liquid to obtain an objective ionic liquid ($R_4NA$).

[Chemical formula 3]

$$R_3N + RX \rightarrow R_4NX \ (X: Cl, Br, I) \quad (1)$$

$$R_4NX + HA \rightarrow R_4NA + HX \quad (2)$$

$$R_4NX + MA \rightarrow R_4NA + MX \ (M: NH_4, Li, Na, K, Ag \text{ etc.}) \quad (3)$$

The hydroxide method is a method performed by a reaction shown in (4) to (8). First, a halide ($R_4NX$) is subjected to ion exchange membrane method electrolysis (reaction equation (4)), an OH-type ion exchange resin method (reaction equation (5)) or a reaction with silver oxide ($Ag_2O$) (reaction equation (6)) to obtain a hydroxide ($R_4NOH$) (as a halogen, chlorine, bromine or iodine is used).

The resulting hydroxide is subjected to a reaction of reaction equations (7) to (8) as in the aforementioned halide method to obtain an objective ionic liquid ($R_4NA$).

[Chemical formula 4]

$$R_4NX + H_2O \rightarrow R_4NOH + \tfrac{1}{2}H_2 + \tfrac{1}{2}X_2 \ (X: Cl, Br, I) \quad (4)$$

$$R_4NX + P\text{—}OH \rightarrow R_4NOH + P\text{—}X \ (P\text{—}OH: \text{OH-type ion exchange resin}) \quad (5)$$

$$R_4NX + \tfrac{1}{2}Ag_2O + \tfrac{1}{2}H_2O \rightarrow R_4NOH + AgX \quad (6)$$

$$R_4NOH + HA \rightarrow R_4NA + H_2O \quad (7)$$

$$R_4NOH + MA \rightarrow R_4NA + MOH \ (M: NH_4, Li, Na, K, Ag \text{ etc.}) \quad (8)$$

The acid ester method is a method performed by a reaction shown in (9) to (11). First, tertiary amine ($R_3N$) is reacted with acid ester to obtain an acid esterified substance (reaction equation (9), as acid ester, ester of an inorganic acid such as sulfuric acid, sulfurous acid, phosphoric acid, phosphorous acid, and carbonic acid, or ester of organic acid such as methanesulfonic acid, methylphosphonic acid and formic acid is used).

The resulting acid esterified substance is subjected to a reaction of reaction equations (10) to (11) as in the aforementioned halide method, to obtain an objective ionic liquid ($R_4NA$). Alternatively, as acid ester, methyl trifluoromethane sulfonate, or methyl trifluoroacetate may be used to directly obtain an ionic liquid.

[Chemical formula 5]

$$R_3N + ROY \rightarrow R_4NOY \quad (9)$$

(OY: OSOR, OSOR, OPOR, OPOR, OCOR, OSR,
‖        ‖       ‖       ‖              ‖
O        O       O       O              O

OR
|
OPR, OCR etc.)
‖      ‖
O      O

[Chemical formula] -continued $$R_4NOY + HA \rightarrow R_4NA + HOY \quad (10)$$

(in the case of OY: OCOR
               ‖
               O )

$$R_4N\text{—OCOR} + HA \rightarrow R_4NA + CO_2 + ROH) \quad$$

$$R_4NOY + MA \rightarrow R_4NA + MOY \quad (11)$$

(M: NH_4, Li, Na, K, Ag etc.)

The chelate forming method is a method performed by a reaction as shown in (12) to (15). First, halide of quaternary ammonium ($R_4NX$), hydroxide of quaternary ammonium ($R_4NOH$), or carbonic acid esterified substance of quaternary ammonium ($R_4NOCO_2CH_3$) is reacted with hydrogen fluoride (HF) or ammonium fluoride ($NH_4F$) to obtain a quaternary ammonium fluoride salt (reaction equation (12) to (14)).

The resulting quaternary ammonium fluoride salt can be subjected to a chelate forming reaction with fluoride such as $BF_3$, $AlF_3$, $PF_5$, $AsF_5$, $SbF_5$, $NbF_5$ and $TaF_6$, to obtain an ionic liquid (reaction equation (15)).

[Chemical formula 6]

$$R_4NX + HF \rightarrow R_4NF + HX \ (X: Cl, Br, I) \quad (12)$$

$$R_4NY + HF \rightarrow R_4NF + HY \ (Y: OH, OCO_2CH_3) \quad (13)$$

$$R_4NY + NH_4F \rightarrow R_4NF + NH_3 + HY \ (Y: OH, OCO_2CH_3) \quad (14)$$

$$R_4NF + MF_{n-1} \rightarrow R_4NMF_n \quad (15)$$

($MF_{n-1}$: $BF_3$, $AlF_3$, $PF_5$, $AsF_5$, $SbF_5$, $NbF_5$, $TaF_5$ etc.)

The neutralization method is a method performed by a reaction shown in (16). An ionic liquid can be obtained by reacting tertiary amine and an organic acid such as $HBF_4$, $HPF_6$, $CH_3COOH$, $CF_3COOH$, $CF_3SO_3H$, $(CF_3SO_2)_2NH$, $(CF_3SO_2)_3CH$, and $(C_2F_5SO_2)_2NH$.

[Chemical formula 7]

$$R_3N + HZ \rightarrow R_3HN^+Z^- \quad (16)$$

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_5SO_2)_2NH$ organic acid such as]

The R of aforementioned (1)~(16) represents hydrogen or a hydrocarbon group of a carbon number of 1 to 20, and may contain a hetero atom.

The blending amount of the ionic liquid can not unconditionally be defined by reason of changing by compatibility between the polymer and the ionic liquid to be used, but yet is generally preferably 0.01 to 40 parts by weight, more preferably 0.03 to 20 parts by weight and most preferably 0.05 to 10 parts by weight with respect to 100 parts by weight of the base polymer. The blending amount of less than 0.01 parts by weight does not allow sufficient antistatic property, while the blending amount of more than 40 parts by weight brings a tendency to increase staining on the adherend.

The present invention uses, as a base polymer, a water-dispersible (meth)acryl-based polymer containing, as a monomer component, 50 to 99.9% by weight of a (meth) acrylate having an alkyl group with a carbon number of 1 to 14. The use of these (meth)acryl-based polymers as a base polymer brings a favorable balance of compatibility between the ionic liquid and the base polymer, so that adherability can sufficiently be maintained.

The (meth)acryl-based polymer used for the present invention is not particularly limited if it is a (meth)acryl-based polymer having adherability corresponding to the above.

Examples of (meth)acrylate having an alkyl group of a carbon number of 1 to 14 include methyl(meth)acrylate, ethyl (meth)acrylate, n-butyl(meth)acrylate, s-butyl(meth)acrylate, t-butyl(meth)acrylate, isobutyl(meth)acrylate, hexyl (meth)acrylate, 2-ethylhexyl(meth)acrylate, n-octyl(meth) acrylate, isooctyl(meth)acrylate, n-nonyl(meth)acrylate, isononyl(meth)acrylate, n-decyl(meth)acrylate, isodecyl (meth)acrylate, n-dodecyl(meth)acrylate, n-tridecyl(meth) acrylate, and n-tetradecyl(meth)acrylate.

Among them, when used in the surface protecting film of the present invention, (meth)acrylate having an alkyl group of a carbon number of 6 to 14 such as hexyl(meth)acrylate, 2-ethylhexyl(meth)acrylate, n-octyl(meth)acrylate, isooctyl (meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate, and n-tetradecyl (meth)acrylate is suitably used. By using a (meth)acryl-based polymer consisting of (meth)acrylate having an alkyl group of a carbon number of 6 to 14, it becomes easy to control a pressure-sensitive adhesive strength to an adherend low, and excellent re-peelability is obtained.

The above-mentioned (meth)acrylate having an alkyl group with a carbon number of 1 to 14 may be used singly or by mixture of two kinds or more, and yet is preferably 50 to 99.9% by weight, more preferably 60 to 99.5% by weight and far more preferably 70 to 99% by weight in the total monomer components of the (meth)acryl-based polymer. The use of the (meth)acryl-based polymer having as the main component the (meth)acrylate having an alkyl group with a carbon number of 1 to 14 brings a favorable balance of compatibility between the ionic liquid and the base polymer, so that adherability can sufficiently be maintained.

In the present invention, a functional group-containing monomer capable of reacting with a crosslinking agent and other polymerizable monomer components for adjusting glass transition point and peeling properties of the (meth) acryl-based polymer can be used in addition to the (meth) acrylate having an alkyl group with a carbon number of 1 to 14.

When (meth)acrylate having an acid functional group such as a carboxyl group and a sulfonic acid group is used, it is preferable to adjust an acid value of a (meth)acryl-based polymer 40 or less. When an acid value of a (meth)acryl-based polymer exceeds 40, there is a tendency that antistatic property is deteriorated. It is preferable that an acid value of a (meth)acryl-based polymer is 29 or less.

The adjustment of an acid value can be performed by the blending amount of a (meth)acrylate having an acid functional group, and examples of the (meth)acryl-based polymer having a carboxyl group include a (meth)acryl-based polymer obtained by copolymerizing 2-ethylhexyl acrylate and acrylic acid, and in this case, the acid value can be brought to a value of 40 or less by adjusting acrylic acid to 5.1 parts by weight or less with respect to 100 parts by weight of the total of 2-ethylhexyl acrylate and acrylic acid. Also, the acid value can be brought to a value of 29 or less by adjusting acrylic acid to 3.7 parts by weight or less.

Properly usable examples of the above-mentioned functional group-containing monomer include components having a functional group for acting as a crosslinking point, such as carboxyl group-containing monomer, acid anhydride group-containing monomer, hydroxyl group-containing monomer, amino group-containing monomer, epoxy group-containing monomers isocyanate group-containing monomer and aziridine group-containing monomer.

Examples of the carboxyl group-containing monomer include (meth)acrylic acid, carboxyethyl(meth)acrylate, carboxypentyl(meth)acrylate, itaconic acid, maleic acid, fumaric acid, crotonic acid, and isocrotonic acid.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol (meth)acrylamide, vinyl alcohol, allyl alcohol, 2-hydroxyethyl vinyl ether, 4-hydroxybutylvinyl ether, and diethylene glycol monovinyl ether.

Examples of the amino group-containing monomer include aminoethyl(meth)acrylate, N,N-dimethylaminoethyl (meth)acrylate, and N,N-dimethylaminopropyl(meth)acrylate.

Examples of the epoxy group-containing monomer include glycidyl(meth)acrylate, methylglycidyl(meth)acrylate, and allyl glycidyl ether.

Examples of the isocyanate group-containing monomer include 2-methacryloyloxyethyl isocyanate.

The above-mentioned functional group-containing (meth) acrylate may be used singly or by mixture of two kinds or more, and yet the content thereof in total is preferably 0.1 to 15% by weight, more preferably 0.2 to 12% by weight and particularly preferably 0.3 to 10% by weight in the total monomer components of the (meth)acryl-based polymer. When the content of the functional group-containing (meth) acrylate is decreased to less than 0.1% by weight, crosslinkage by a crosslinking agent becomes insufficient and then the cohesive strength of a pressure-sensitive adhesive composition becomes so low as to bring a tendency to result in an adhesive residue. On the other hand, when the content of the functional group-containing (meth)acrylate is increased to more than 15% by weight, the cohesive strength of a pressure-sensitive adhesive composition becomes so high as to lower fluidity and then the wetting of the adherend becomes so insufficient as to bring a tendency to result in peeling off.

Polymerizable monomers for adjusting glass transition point and peeling properties of the (meth)acryl-based polymer can be used as other polymerizable monomer components in a range of not deteriorating the effect of the present invention.

Properly usable examples of other polymerizable monomer components include components for improving cohesive strength or heat resistance, such as sulfonic acid group-containing monomer, phosphoric acid group-containing monomer, cyano group-containing monomer, vinyl esters and aromatic vinyl compounds, and components having a functional group for acting as an improvement in adhesive strength or a crosslinking point, such as amide group-containing monomer, imide group-containing monomer, N-(meth)acryloyl morpholine and vinyl ethers.

Examples of the sulfonic acid group-containing monomer include styrenesulfonic acid, allylsulfonic acid, 2-(meth) acrylamido-2-methylpropanesulfonic acid, (meth)acrylamidopropanesulfonic acid, sulfopropyl(meth)acrylate, (meth) acryloyloxynaphthalenesulfonic acid, and sodium vinylsulfonate.

Examples of the phosphoric acid group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the imido group-containing monomer include cyclohexylmaleimide, isopropylmaleimide, N-cyclohexylmaleimide, and itaconeimide.

Examples of vinyl ethers include methyl vinyl ether, ethyl vinyl ether, and isobutyl vinyl ether.

The above-mentioned other polymerizable monomer components may be used singly or by mixture of two kinds or more, and yet the content thereof in total is preferably 0 to 35% by weight, more preferably 0 to 30% by weight and particularly preferably 0 to 25% by weight in the total monomer components of the (meth)acryl-based polymer. The use of the other polymerizable monomer components allows favorable interaction with the ionic liquid and favorable adhesive property to be properly adjusted.

The glass transition temperature (Tg) of the above-mentioned (meth)acryl-based polymer as a base polymer is typically preferably $-100$ to $0°$ C., more preferably $-80$ to $-10°$ C. A glass transition temperature higher than $0°$ C. occasionally allows sufficient adhesive strength with difficulty. The glass transition temperature (Tg) of the (meth)acryl-based polymer can be adjusted within the above-mentioned range by properly changing the used monomer components and composition ratio thereof.

A water-dispersible (meth)acryl-based polymer obtained by subjecting the above-mentioned monomer component blend to emulsion polymerization in the presence of an emulsifying agent is used as the (meth)acryl-based polymer of the present invention. The obtained polymer may be any of a random copolymer, a block copolymer and a graft copolymer.

In the present invention, an emulsifying agent and a polymerization initiator used for emulsion polymerization are not particularly limited but can be used through proper selection.

Examples of the emulsifying agent used for the present invention include anionic emulsifying agents such as alkyl sulfates, alkyl benzenesulfonates, alkyl sulfosuccinates, polyoxyethylene alkyl sulfates and polyoxyethylene alkyl phosphates, and nonionic emulsifying agents such as polyoxyethylene alkyl ethers, polyoxyethylene alkyl phenyl ethers, polyoxyethylene-polyoxypropylene block polymers, sorbitan fatty acid esters and polyoxyethylene fatty acid esters.

In addition, a reactive emulsifying agent into which radical polymerizable functional groups (reactive functional groups) such as propenyl group, allyl group, (meth)acryloyl group and allyl ether group are introduced may be used as the emulsifying agent. The inclusion of radical polymerizable functional groups causes the radical polymerizable functional groups to be introduced into a base polymer chain by the reaction, so that the emulsifying agent can be prevented from bleeding on the adherend.

In addition, a reactive emulsifying agent having alkylene oxide group may also be used as the reactive emulsifying agent. The use of a reactive emulsifying agent having alkylene oxide group causes the alkylene oxide group to be introduced into a base polymer chain by the reaction, so that compatibility between the base polymer and the ionic liquid is improved, which ionic liquid is appropriately restrained from bleeding on the adherend to allow a pressure-sensitive adhesive composition with low staining property.

Examples of the above-mentioned reactive emulsifying agent having alkylene oxide group include AQUARON HS-10, HS-20, KH-10, BC-05, BC-10, BC-20 and BC-2020 (any one hereinbefore is manufactured by Dai-Ichi Kogyo Seiyaku Co., Ltd.), ADEKA REASOAP SE-10N (manufactured by ADEKA CORPORATION), and LATEMUL PD-104 (manufactured by Kao Corporation).

The above-mentioned emulsifying agent may be used singly or by mixture of two kinds or more, and yet the content thereof in total is preferably 0.1 to 10 parts by weight, more preferably 0.3 to 5 parts by weight with respect to 100 parts by weight of the monomers in view of polymerization stability and mechanical stability.

Examples of a polymerization operation include such that the above-mentioned monomer and copolymerizable monomer are first mixed and blended with an emulsifying agent and water to thereafter prepare emulsion by emulsification. Then, with regard to the monomer, all or a part of the total amount to be used can be blended and the rest thereof can be dropped during the polymerization. Subsequently, a polymerization initiator and, as required, water are added to this emulsion, which is subject to emulsion polymerization.

Water may be blended only during the preparation of the emulsion, or thereafter further blended, which one can properly be selected in accordance with the after-mentioned polymerization method. The blending amount of water is not particularly limited but prepared so that the solid content concentration of the (meth)acryl-based polymer after the emulsion polymerization becomes 30 to 75% by weight, preferably 35 to 70% by weight.

A method of emulsion polymerization is not particularly limited but can properly be selected from a batch polymerization method (a batch charge method), a continuous dropping method (a monomer dropping method and a monomer emulsion dropping method), and a polymerization method with a combination thereof.

In a batch polymerization method, for example, a monomer mixture, an emulsifying agent and water are charged into a reaction vessel and emulsified by stirring and mixing to prepare emulsion, and thereafter a polymerization initiator and, as required, water are further added to this reaction vessel to perform emulsion polymerization.

In a continuous dropping method, for example, a monomer mixture, an emulsifying agent and water are first added and emulsified by stirring and mixing to prepare a dropping liquid, and simultaneously a polymerization initiator and water are charged into a reaction vessel to subsequently drop the dropping liquid into the reaction vessel and perform emulsion polymerization.

Known additives such as pH buffering agent, neutralizer, foam inhibitor and stabilizer can properly be used as an additive after the emulsion polymerization.

Examples of the polymerization initiator used for the present invention include, but are not limited to, azo initiators such as 2,2'-azobisisobutyronitrile, 2,2'-azobis[2-(5-methyl- 2-imidazoline-2-yl)propane]dihydrochloride, 2,2'-azobis(2-methylpropionamidine)disulfate, 2,2'-azobis(2-methylpropionamidine)dihydrochloride, 2,2'-azobis(N,N'-dimethyleneisobutylamidine)dihydrochloride and 2,2'-azobis[N-(2-carboxyethyl)-2-methylpropionamidine] hydrate, persulfates such as potassium persulfate and ammonium persulfate, peroxide initiators such as di(2-ethylhexyl)peroxydicarbonate, di(4-tert-butylcyclohexyl)peroxydicarbonate, di-sec-butyl peroxydicarbonate, tert-butyl peroxyneodecanoate, tert-hexyl peroxypivalate, tert-butyl peroxypivalate, dilauroyl peroxide, di-n-octanoyl peroxide, 1,1,3,3-tetramethyl butyl peroxy-2-ethyl hexanoate, di(4-methylbenzoyl)peroxide, benzoyl peroxide, tert-butyl peroxyisobutyrate, 1,1-di(tert-hexyl peroxy)cyclohexane, tert-butyl hydroperoxide and hydrogen peroxide, and redox initiators with peroxides and reducing agents combined, such as a combination of persulfate and sodium hydrogen sulfite, and a combination of peroxide and sodium ascorbate.

The above-mentioned polymerization initiator may be used singly or by mixture of two kinds or more, and yet the content thereof in total is typically preferably 0.001 to 0.1 parts by weight, more preferably 0.002 to 0.05 parts by weight with respect to 100 parts by weight of the monomers.

In the present invention, a chain transfer agent may be used for the polymerization. The use of these chain transfer agents allows the molecular weight of the (meth)acryl-based polymer to be adjusted.

Examples of the chain transfer agent include lauryl mercaptan, glycidyl mercaptan, mercaptoacetic acid, 2-mercaptoethanol, thioglycolic acid, 2-ethylhexyl thioglycolate and 2,3-dimercapto-1-propanol.

These chain transfer agents may be used singly or by mixture of two kinds or more, and yet the content thereof in total is preferably 0.01 to 1 part by weight with respect to 100 parts by weight of the monomers.

In the pressure-sensitive adhesive composition of the present invention, pressure-sensitive adhesive sheets further excellent in heat resistance are obtained by appropriately crosslinking a base polymer, in particular, a (meth)acryl-based polymer. Examples of a specific means for a crosslinking method include a so-called method of using a crosslinking agent, in which a compound having a group reactive with a carboxyl group, a hydroxyl group, an amino group or an amido group which is appropriately contained as a crosslinking basal point in a (meth)acrly-based polymer such as an isocyanate compound, an epoxy compound, a melanine-based resin and an aziridine compound, carbodiimide compound, and a metallic chelate compound is added to react them. These compounds may be used alone, or may be used by mixing two or more kinds of them.

In addition, a water-soluble crosslinking agent is preferably used in a pressure-sensitive adhesive composition of the present invention in view of using a water-dispersible (meth)acryl-based polymer as a base polymer.

Examples of the water-soluble crosslinking agent include epoxy compounds such as polyethylene glycol glycidyl ether, water-soluble isocyanate compounds, oxazoline compounds, aziridine compounds, hydrophilic-treated carbodiimide compounds, active methylol compounds, active alkoxymethyl compounds and metal chelate compounds.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, flowability is reduced, and wetting on an adherend becomes insufficient, and there is a tendency that this becomes cause for peeling.

Further, the previously known tackifiers, a surfactant agent, surface lubricant agent, a leveling agent, an antioxidant, a corrosion preventing agent, a photo stabilizer, an ultraviolet absorbing agent, a polymerization inhibitor, and a silane coupling agent, or the previously known various additives such as a powder, a particle, and a foil of inorganic or organic filer, metal powder and pigment may be appropriately added to the pressure-sensitive adhesive composition used in the pressure-sensitive adhesive sheet of the present invention depending on utility.

Meanwhile, the pressure-sensitive adhesive layer in the present invention is such that the aforementioned pressure-sensitive adhesive composition is crosslinked. In addition, pressure-sensitive adhesive sheets of the present invention are such that the pressure-sensitive adhesive layer is formed on a supporting film. Thereupon, crosslinking of the pressure-sensitive adhesive composition is generally performed after coating of the pressure-sensitive adhesive composition, and a pressure-sensitive adhesive layer composition after crosslinking may be also transferred onto a supporting film.

A method of forming a pressure-sensitive adhesive layer on a film is not particularly limited, but for example, a layer is prepared by coating the aforementioned pressure-sensitive adhesive composition on a supporting film, and drying this to remove a polymerization solvent (water or water solution) to form a pressure-sensitive adhesive layer on a supporting film. Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape. In particular, it is preferable to use a plastic substrate as a support in a case of a surface protecting film.

The plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

A thickness of the film is usually 5 to 200 μm, preferably around 10 to 100 μm.

A multilayer film comprising a plastic substrate laminated, such as a polarizing plate, a retardation plate, a brightness enhancement plate and an antiglare sheet, can also be used as a plastic substrate.

The plastic substrate may be subjected to releasing, antistaining or acid treatment with silicone, fluorine, long chain alkyl-based or fatty acid amide-based releasing agent, or a silica powder, easy adhesion treatment such as acid treatment, alkali treatment, primer treatment, corona treatment, plasma treatment, and ultraviolet ray treatment, or coating-type, kneading-type, or deposition-type antistatic treatment, if necessary.

In addition, it is more preferably that a plastic substrate used in the surface protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used.

Examples of a method of providing an electrification preventing layer on at least one side of a film include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as aminoalcohol and a derivative, glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, acyloylamidopropyltrimethylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl)alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol(meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melamine and epoxy is used. In the case of a polymer-type electrification preventing agent, it is not necessary that a resin component is contained. In addition, the electrification preventing resin component may contain compounds of a methylolated or alkylolated melamine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 μm, preferably around 0.03 to 1 μm.

Examples of a method of depositing or plating an electrically conductive substance include vacuum deposition, sputtering, ion plating, chemical deposition, spray pyrolysis, chemical plating, and electric plating methods.

A thickness of the electrically conductive substance layer is usually 20 to 10000 Å, preferably 50 to 5000 Å.

As the kneading-type electrification preventing agent, the aforementioned electrification preventing agent is appropriately used.

An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

If necessary, a separator (or peeling liner, peeling sheet etc.) can be laminated on a surface of a pressure-sensitive adhesive for the purpose of protecting a pressure-sensitive adhesive surface. As a substrate constituting a separator, there are a paper and a plastic film, and a plastic film is suitably used from a viewpoint of excellent surface smoothness.

The film is not particularly limited as far as it is a film which can protect the pressure-sensitive adhesive layer, and examples include a polyolefin film such as polyethylene, polypropylene, poly-1-butene, poly-4-methyl-1-pentene, ethylene-propylene copolymer, ethylene.1-butene copolymer, ethylene.vinyl acetate copolymer, thylene.ethyl acrylate copolymer, and ethylene.vinyl alcohol copolymer, a polyether film such as polyethylene terephthalate, polyethylene naphthalate, and polybutylene terephthalate, a polyacrylate film, a polystyrene film, a polyamide film such as nylon 6, nylon 6,6, and partially aromatic polyamide, a polyvinyl chloride film, a poly vinylidene chloride film, and a polycarbonate film.

A thickness of the film is usually around 5 to 200 μm, preferably around 10 to 100 μm. A pressure-sensitive adhesive layer applying surface of the film is appropriately subjected to treatment with a releasing agent such as a silicone-based, fluorine-based, long chain alkyl-based, or fatty acid amide-based releasing agent, or a silica powder.

A pressure-sensitive adhesive composition, a pressure-sensitive adhesive layer and a pressure-sensitive adhesive sheet employing the present invention are particularly used for plastic products with static electricity easily caused, and above all, they are useful as antistatic pressure-sensitive adhesive sheet and surface protecting film used for avoiding static electricity in an electronic instrument and the like.

EXAMPLES

Examples which specifically show a construction and effect of the present invention will be explained below. Assessment items in Examples were measured as follows:

<Measurement of Acid Value>

An acid value was measured using an automatically titrating apparatus (COM-550 manufactured by HIRANUMA SANGYO Co., Ltd.), and was obtained by the following equation.

$$A = \{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)
Measurement conditions are as follows:

Sample solution: About 0.5 g of a polymer sample was dissolved in 50 g of a mixed solvent (toluene/2-propanol/distilled water=50/49.5/0.5, weight ratio) to obtain a sample solution.

Titration solution: 0.1N 2-propanolic potassium hydroxide solution (for petroleum product neutralization value test manufactured by Wako Pure Chemical Industries, Ltd.)

Electrode: glass electrode; GE-101, comparative electrode; RE-201, Measurement mode: petroleum product neutralization value test 1

<Measurement of Glass Transition Temperature Tg>

A glass transition temperature Tg(° C.) was obtained by the following equation using the following reference values as a glass transition temperature $Tg_n$(° C.) of a homopolymer of each monomer.

Equation:

$$1/(Tg+273) = \Sigma[W_n/(Tg_n+273)]$$

[wherein Tg (° C.) represents a glass transition temperature of a copolymer, $W_n$ (-) represents a weight fraction of each monomer, $Tg_n$ (° C.) represents a glass transition temperature of a homopolymer of each monomer, and n represents a kind of each monomer]

Reference Values:
2-Ethylhexyl acrylate: −70° C.
n-Butyl acrylate: −55° C.
n-Butyl methacrylate: 20° C.
Acrylic acid: 106° C.

<Preparation of Acryl-Based Polymer>

(Acryl-Based Polymer (A))

59 parts by weight of n-butyl acrylate, 40 parts by weight of n-butyl methacrylate, 1 part by weight of acrylic acid, 2 parts by weight of an anionic reactive emulsifying agent (AQUARON BC-2020, manufactured by Dai-Ichi Kogyo Seiyaku Co., Ltd.) and 0.6 parts by weight of a polyoxyethylene alkyl phosphate emulsifying agent (PHOSPHANOL RE-410, manufactured by Toho Chemical Industry Co., Ltd) as emulsifying agents were charged into a reaction vessel provided with a stirring impeller, a thermometer, a nitrogen gas inlet tube, a condenser and a dropping funnel, emulsified in 150 parts by weight of water, and nitrogen-substituted for 2 hours. Subsequently, after being heated to a temperature of 55° C., 0.03 parts by weight of 2,2'-azobis(2-methylpropionamidine)dihydrochloride as a polymerization initiator was charged thereinto to introduce nitrogen gas thereto while gently stirring and perform polymerization reaction for 8 hours while retaining liquid temperature in the flask at 55° C. Thereafter, the liquid was cooled to room temperature and neutralized with 10% by weight-ammonia water to prepare a water-dispersible acryl-based polymer (A) solution. This acryl-based polymer (A) had Tg=−29° C. and an acid value of 7.5.

(Acryl-Based Polymer (B))

49.5 parts by weight of 2-ethylhexyl acrylate, 49.5 parts by weight of n-butyl methacrylate, 1 part by weight of acrylic acid, 2 parts by weight of an anionic reactive emulsifying agent (AQUARON BC-2020, manufactured by Dai-Ichi Kogyo Seiyaku Co., Ltd.) were charged into a reaction vessel provided with a stirring impeller, a thermometer, a nitrogen gas inlet tube, a condenser and a dropping funnel, emulsified in 150 parts by weight of water, and nitrogen-substituted for 2 hours. Subsequently, after being heated to a temperature of 55° C., 0.03 parts by weight of 2,2'-azobis(2-methylpropionamidine)dihydrochloride as a polymerization initiator was charged thereinto to introduce nitrogen gas thereto while gently stirring and perform polymerization reaction for 8 hours while retaining liquid temperature in the flask at 55° C. Thereafter, the liquid was cooled to room temperature and neutralized with 10% by weight-ammonia water to prepare a water-dispersible acryl-based polymer (B) solution. This acryl-based polymer (B) had $Tg=-32°$ C. and an acid value of 7.6.

(Acryl-Based Polymer (C))

96 parts by weight of 2-ethylhexyl acrylate, 4 parts by weight of acrylic acid and 3 parts by weight of an anionic emulsifying agent (HIGHTENOL N-17, manufactured by Dai-Ichi Kogyo Seiyaku Co., Ltd.) as an emulsifying agent were charged into a reaction vessel provided with a stirring impeller, a thermometer, a nitrogen gas inlet tube, a condenser and a dropping funnel, emulsified in 153 parts by weight of water, and nitrogen-substituted for 2 hours. Subsequently, 0.03 parts by weight of 2,2'-azobis(2-methylpropionamidine)dihydrochloride as a polymerization initiator was charged thereinto to introduce nitrogen gas thereto while gently stirring and perform polymerization reaction for 7 hours while retaining liquid temperature in the flask at 55° C. Thereafter, the liquid was cooled to room temperature and neutralized with 10% by weight-ammonia water to prepare a water-dispersible acryl-based polymer (C) solution. This acryl-based polymer (C) had $Tg=-66°$ C. and an acid value of 30.

(Acryl-Based Polymer (D))

96 parts by weight of n-butyl acrylate, 4 parts by weight of acrylic acid and 3 parts by weight of an anionic emulsifying agent (HIGHTENOL N-17, manufactured by Dai-Ichi Kogyo Seiyaku Co., Ltd.) as an emulsifying agent were charged into a reaction vessel provided with a stirring impeller, a thermometer, a nitrogen gas inlet tube, a condenser and a dropping funnel, emulsified in 153 parts by weight of water, and nitrogen-substituted for 2 hours. Subsequently, 0.03 parts by weight of 2,2'-azobis(2-methylpropionamidine)dihydrochloride as a polymerization initiator was charged thereinto to introduce nitrogen gas thereto while gently stirring and perform polymerization reaction for 7 hours while retaining liquid temperature in the flask at 55° C. Thereafter, the liquid was cooled to room temperature and neutralized with 10% by weight-ammonia water to prepare a water-dispersible acryl-based polymer (D) solution. This acryl-based polymer (D) had $Tg=-51°$ C. and an acid value of 31.

<Production of Antistatic-Treated Film>

An antistatic agent solution was prepared by diluting 10 parts by weight of an antistatic agent (MICROSOLVER RMd-142, manufactured by SOLVEX Co., Ltd., having tin oxide and polyester resin as the main components) with a mixed solvent of 30 parts by weight of water and 70 parts by weight of methanol.

The obtained antistatic agent solution was applied on a polyethylene terephthalate (PET) film (a thickness of 38 μm) by using a Meyer bar, and the solvent was removed therefrom by drying at a temperature of 130° C. for 1 minute to form an antistatic layer (a thickness of 0.2 μm) and produce an antistatic-treated film.

Example 1

Preparation of Pressure-Sensitive Adhesive Composition 5 parts by weight of 1-butyl-3-methylpyridinium trifluoromethanesulfonate (manufactured by Japan Carlit Co., Ltd., BMP-Trf, water-soluble, liquid at a temperature of 25° C.) as an antistatic agent and 10 parts by weight of an oxazoline group-containing water-soluble crosslinking agent (EPOCROS WS-500, manufactured by NIPPON SHOKUBAI Co., Ltd., 40% by weight) as a crosslinking agent were added to 100 parts by weight of solid content of the acryl-based polymer (A) solution, and mixed while stirring at a temperature of 25° C. for approximately 1 minute to prepare a water-dispersible acryl pressure-sensitive adhesive solution (1). It was confirmed that the solution was water-soluble by preparing 10% by weight-aqueous solution of BMP-Trf.

(Production of Pressure-Sensitive Adhesive Sheet)

The acryl pressure-sensitive adhesive solution (1) was applied on the opposite surface of the above-mentioned antistatic-treated film to the antistatic-treated surface, and heated at a temperature of 110° C. for 3 minutes to form a pressure-sensitive adhesive layer having a thickness of 15 μm. Subsequently, the silicone-treated surface of a polyethylene terephthalate film with silicone treatment performed on one side having a thickness of 25 μm was stuck to the surface of the pressure-sensitive adhesive layer to produce a pressure-sensitive adhesive sheet.

Example 2

Preparation of Pressure-Sensitive Adhesive Composition

A water-dispersible acrylic pressure-sensitive adhesive solution (2) was prepared in the same manner as example 1 except for replacing the acryl-based polymer (A) with the acryl-based polymer (B).

(Production of Pressure-Sensitive Adhesive Sheet)

A pressure-sensitive adhesive sheet was produced in the same manner as example 1 except for replacing the acryl pressure-sensitive adhesive solution (1) with the acryl pressure-sensitive adhesive solution (2).

Comparative Example 1

Preparation of Pressure-Sensitive Adhesive Composition

A water-dispersible acryl pressure-sensitive adhesive solution (3) was prepared in the same manner as example 1 except for not using the 1-butyl-3-methylpyridinium trifluoromethanesulfonate (manufactured by Japan Carlit Co., Ltd., BMP-Trf, liquid at a temperature of 25° C.).

(Production of Pressure-Sensitive Adhesive Sheet)

A pressure-sensitive adhesive sheet was produced in the same manner as example 1 except for replacing the acryl pressure-sensitive adhesive solution (1) with the acryl pressure-sensitive adhesive solution (3).

Comparative Example 2

Preparation of Pressure-Sensitive Adhesive Composition

A water-dispersible acryl pressure-sensitive adhesive solution (4) was prepared in the same manner as example 2 except for not using the 1-butyl-3-methylpyridinium trifluoromethanesulfonate (manufactured by Japan Carlit Co., Ltd., BMP-Trf, liquid at a temperature of 25° C.).

(Production of Pressure-Sensitive Adhesive Sheet)

A pressure-sensitive adhesive sheet was produced in the same manner as example 1 except for replacing the acryl pressure-sensitive adhesive solution (1) with the acryl pressure-sensitive adhesive solution (4).

Comparative Example 3

Preparation of Pressure-Sensitive Adhesive Composition

The preparation of a water-dispersible acryl pressure-sensitive adhesive solution (5) was attempted in the same manner as example 1 except for replacing 5 parts by weight of the 1-butyl-3-methylpyridinium trifluoromethanesulfonate (manufactured by Japan Carlit Co., Ltd., liquid at a temperature of 25° C.) with 5 parts by weight of n-lauryltrimethylammonium chloride (manufactured by Tokyo Chemical Industry Co., Ltd., solid at a temperature of 80° C.), but yet cohesion was caused in the acryl pressure-sensitive adhesive solution (5).
(Production of Pressure-Sensitive Adhesive Sheet)
A pressure-sensitive adhesive sheet could not be produced for the reason that coagulation was caused in the acryl pressure-sensitive adhesive solution (5).

Example 3

Preparation of Pressure-Sensitive Adhesive Composition

A water-dispersible acryl pressure-sensitive adhesive solution (6) was prepared in the same manner as example 1 except for replacing the acryl-based polymer (A) with the acryl-based polymer (C).
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (6).

Example 4

Preparation of Pressure-Sensitive Adhesive Composition

A water-dispersible acryl pressure-sensitive adhesive solution (7) was prepared in the same manner as example 1 except that 4 parts by weight of 1-butyl-3-methylpyridinium trifluoromethanesulfonate (manufactured by Japan Carlit Co., Ltd., BMP-Trf, water-soluble, liquid at a temperature of 25° C.) as an antistatic agent and 5 parts by weight of an oxazoline group-containing water-soluble crosslinking agent (EP-OCROS WS-500, manufactured by NIPPON SHOKUBAI Co., Ltd., 40% by weight) as a crosslinking agent were added to 100 parts by weight of solid content of the acryl-based polymer (D) solution instead of the acryl-based polymer (A).
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (7).

Example 5

Preparation of Pressure-Sensitive Adhesive Composition

A water-dispersible acryl pressure-sensitive adhesive solution (8) was prepared in the same manner as example 1 except for replacing the acryl-based polymer (A) with the acryl-based polymer (C) and replacing 5 parts by weight of the 1-butyl-3-methylpyridinium trifluoromethanesulfonate (manufactured by Japan Carlit Co., Ltd., BMP-Trf, water-soluble, liquid at a temperature of 25° C.) as an antistatic agent with 5 parts by weight of 1-ethyl-3-methylimidazolium trifluoromethanesulfonate (manufactured by Tokyo Chemical Industry Co., Ltd., water-soluble, liquid at a temperature of 25° C.). It was confirmed that the solution was water-soluble by preparing 10% by weight-aqueous solution of 1-ethyl-3-methylimidazolium trifluoromethanesulfonate.
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (8).

Example 6

Preparation of Pressure-Sensitive Adhesive Composition

A water-dispersible acryl pressure-sensitive adhesive solution (9) was prepared in the same manner as example 1 except for replacing 5 parts by weight of the 1-butyl-3-methylpyridinium trifluoromethanesulfonate (manufactured by Japan Carlit Co., Ltd., BMP-Trf, water-soluble, liquid at a temperature of 25° C.) as an antistatic agent with 2.5 parts by weight of 1-butyl-3-methylimidazolium trifluoromethanesulfonate (manufactured by Acros Organics, water-soluble, liquid at a temperature of 25° C.) with respect to 100 parts by weight of solid content of the acryl-based polymer (C) solution instead of the acryl-based polymer (A). It was confirmed that the solution was water-soluble by preparing 10% by weight-aqueous solution of 1-butyl-3-methylimidazolium trifluoromethanesulfonate.
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (9).

Example 7

Preparation of Pressure-Sensitive Adhesive Composition

A water-dispersible acryl pressure-sensitive adhesive solution (10) was prepared in the same manner as example 1 except for replacing 5 parts by weight of the 1-butyl-3-methylpyridinium trifluoromethanesulfonate (manufactured by Japan Carlit Co., Ltd., BMP-Trf, water-soluble, liquid at a temperature of 25° C.) as an antistatic agent with 9 parts by weight of 1-hexyl-3-methylimidazolium bromide (manufactured by Acros Organics, water-soluble, liquid at a temperature of 25° C.) with respect to 100 parts by weight of solid content of the acryl-based polymer (C) solution instead of the acryl-based polymer (A). It was confirmed that the solution was water-soluble by preparing 10% by weight-aqueous solution of 1-hexyl-3-methylimidazolium bromide.
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (10).

Comparative Example 4

Preparation of Pressure-Sensitive Adhesive Composition

A water-dispersible acryl pressure-sensitive adhesive solution (11) was prepared in the same manner as example 3 except for not using the 1-butyl-3-methylpyridinium trifluoromethanesulfonate (manufactured by Japan Carlit Co., Ltd., BMP-Trf, liquid at a temperature of 25° C.).
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (11).

Comparative Example 5

Preparation of Pressure-Sensitive Adhesive Composition

A water-dispersible acryl pressure-sensitive adhesive solution (12) was prepared in the same manner as example 4 except for not using the 1-butyl-3-methylpyridinium trifluoromethanesulfonate (manufactured by Japan Carlit Co., Ltd., BMP-Trf, liquid at a temperature of 25° C.).
(Production of Pressure-Sensitive Adhesive Sheet)
A pressure-sensitive adhesive sheet was produced in the same manner as example 1 except for replacing the acryl pressure-sensitive adhesive solution (1) with the acryl pressure-sensitive adhesive solution (12).

Regarding pressure-sensitive adhesive sheets obtained in the aforementioned Examples and Comparative Examples, a peeling electrification voltage, staining property and an adhesive strength, and an occurrence of cohesion were assessed under the following conditions.

<Measurement of Peeling Electrification Voltage>

The produced pressure-sensitive adhesive sheet was cut into a size of a width of 70 mm and a length of 130 mm to peel a separator thereof, which sheet was thereafter adhered by a hand roller on the surface of an acrylic plate previously destaticized (ACRYLITE, manufactured by MITSUBISHI RAYON Co., Ltd., thickness: 1 mm, width: 70 mm, length: 100 mm), or the surface of a polarizing plate (SEG1425DU, manufactured by Nitto Denko Corporation, width: 70 mm, length: 100 mm) stuck to the acrylic plate previously destaticized (ACRYLITE, manufactured by MITSUBISHI RAYON Co., Ltd., thickness: 1 mm, width: 70 mm, length: 100 mm) so that one end thereof protruded by 30 mm.

Figure 2:
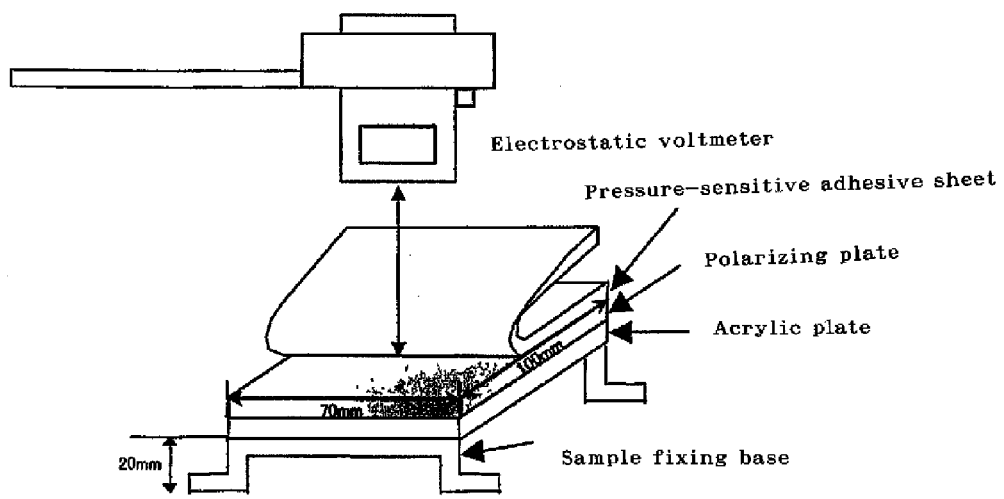
FIG. 2 is a schematic construction view of an electrostatic measuring part used for measuring a peeling electrification voltage in Examples.

After being left under an environment of 23° C. and 50% RH for one day, the sample was set in a predetermined position as shown in FIGS. 1 and 2. The one end protruding by 30 mm was fixed in an automatic wind-up machine and peeled off so as to have a peeling angle of 150° and a peeling rate of 10 m/min. Electric potential on the acrylic plate surface or the polarizing plate surface and electric potential on the pressure-sensitive adhesive sheet surface, which then occurred, were measured by an electrostatic voltmeter (KSD-0103, manufactured by Kasuga Electric Works Ltd.) fixed in the central position in the lengthwise direction of the sample. The distance between the sample and the electrostatic voltmeter was determined at 100 mm in measuring on the acrylic plate surface or the polarizing plate surface and 50 mm in measuring on the pressure-sensitive adhesive sheet surface. The measurement was performed under an environment of 23° C. and 50% RH.

<Evaluation of Staining Property>

The produced pressure-sensitive adhesive sheet was cut into a size of a width of 50 mm and a length of 80 mm to peel a separator thereof, which sheet was thereafter adhered by a hand roller on the surface of an acrylic plate (ACRYLITE, manufactured by MITSUBISHI RAYON Co., Ltd., thickness: 1 mm, width: 70 mm, length: 100 mm) to produce an evaluation sample.

The sample was allowed to stand for 24 hours under the environment of 23° C.×50% RH and, thereafter, the pressure-sensitive adhesive sheet was peeled from the adherend by a hand, and the state of staining of an adherend surface was observed with naked eyes. Assessment criteria were such that the case of observation of non staining was ○, and the case of observation of staining was x.

<Measurement of Adhesive Strength>

The produced pressure-sensitive adhesive sheet was cut into a size of a width of 25 mm and a length of 100 mm to peel a separator thereoff, which sheet was thereafter laminated at a pressure of 0.25 MPa on a polarizing plate (SEG1425DU, manufactured by Nitto Denko Corporation, width: 70 mm, length: 100 mm) to produce an evaluation sample.

After being laminated and then left under an environment of 23° C. and 50% RH for 30 minutes, adhesive strength in peeling off at a peeling rate of 10 m/min and a peeling angle of 180° was measured by a tensile tester. The measurement was performed under an environment of 23° C. and 50% RH.

<Evaluation of Coagulation Property>

The presence of coagulation property of the prepared acryl pressure-sensitive adhesive solution was visually observed and evaluated. The criterion for evaluation is as follows.
the case where no coagulation was recognized: ○
the case where coagulation was recognized: x
The above-mentioned results are shown in table 1.

TABLE 1

| | Peeling electrification voltage [kV] | | | | | | |
| --- | --- | --- | --- | --- | --- | --- | --- |
| | Sticking to acrylic plate | | Sticking to polarizing plate | | | | |
| | Acrylic plate | Pressure-sensitive adhesive sheet | Polarizing plate | Pressure-sensitive adhesive sheet | Staining property [-] | Adhesive strength [N/25 mm] | Coagulation property [-] |
| Example 1 | 0.0 | 0.0 | +0.4 | 0.0 | ○ | 1.18 | ○ |
| Example 2 | −0.1 | 0.0 | 0.0 | 0.0 | ○ | 0.14 | ○ |
| Comparative Example 1 | −1.5 | −5.0 | +1.8 | −4.5 | ○ | 0.85 | ○ |

TABLE 1-continued

| | Peeling electrification voltage [kV] | | | | | | |
|---|---|---|---|---|---|---|---|
| | Sticking to acrylic plate | | Sticking to polarizing plate | | | | |
| | Acrylic plate | Pressure-sensitive adhesive sheet | Polarizing plate | Pressure-sensitive adhesive sheet | Staining property [-] | Adhesive strength [N/25 mm] | Coagulation property [-] |
| Comparative Example 2 | −0.5 | −0.6 | +2.1 | −4.6 | ○ | 0.19 | ○ |
| Comparative Example 3 | — | — | — | — | — | — | x |
| Example 3 | 0.0 | 0.0 | 0.0 | 0.0 | ○ | 0.65 | ○ |
| Example 4 | −0.3 | 0.0 | 0.0 | 0.0 | ○ | 0.36 | ○ |
| Example 5 | 0.0 | 0.0 | 0.0 | 0.0 | ○ | 0.30 | ○ |
| Example 6 | +0.1 | 0.0 | 0.0 | 0.0 | ○ | 0.91 | ○ |
| Example 7 | +0.3 | 0.0 | 0.0 | 0.0 | ○ | 0.34 | ○ |
| Comparative Example 4 | +2.0 | 0.0 | +2.0 | 0.0 | ○ | 2.99 | ○ |
| Comparative Example 5 | −2.0 | 0.0 | +2.0 | 0.0 | ○ | 0.47 | ○ |

Through the above-mentioned results in table 1, it was clarified that in the case (examples 1 to 7) of using the pressure-sensitive adhesive composition produced according to the present invention, any of the examples was excellent in adhesion reliance, and peeling electrification voltage of the pressure-sensitive adhesive sheet itself after peeling off the pressure-sensitive adhesive reliance, and peeling electrification voltage of the pressure-sensitive adhesive sheet itself after peeling off the pressure-sensitive adhesive sheet and peeling electrification voltage of the acrylic plate and the polarizing plate were restrained, and neither staining nor coagulation was caused.

On the contrary, in the case (comparative examples 1 to 2, 4 to 5) of not using an ionic liquid as an antistatic agent, any thereof resulted in high peeling electrification voltage of the acrylic plate and the polarizing plate. In the case (comparative example 3) of using the surfactant as an antistatic agent, it proved that coagulation was caused in the acryl pressure-sensitive adhesive solution and a pressure-sensitive adhesive sheet could not be produced. Accordingly, any of the comparative examples resulted in no possibility of bringing restraint of peeling electrification voltage of the pressure-sensitive adhesive sheet, the acrylic plate and the polarizing plate as well as restraint of the occurrence of coagulation, so that it was clarified that any thereof was not appropriate for an antistatic pressure-sensitive adhesive composition for a pressure-sensitive adhesive sheet.

What is claimed is:

1. A pressure-sensitive adhesive composition characterized by comprising a water-dispersible (meth)acryl-based polymer containing, as a monomer component, 50 to 99.9% by weight of a (meth)acrylate having an alkyl group with a carbon number of 1 to 14, and an ionic liquid, wherein the water-dispersible (meth)acryl-based polymer has an acid value of 40 or less.

2. The pressure-sensitive adhesive composition according to claim 1, wherein the ionic liquid is at least one kind or more of a nitrogen-containing onium salt, a sulfur-containing onium salt, and a phosphorus-containing onium salt.

3. The pressure-sensitive adhesive composition according to claim 1, wherein the ionic liquid contains one or more cations represented by the following general formulas (A) to (D):

[Chemical Formula 1]

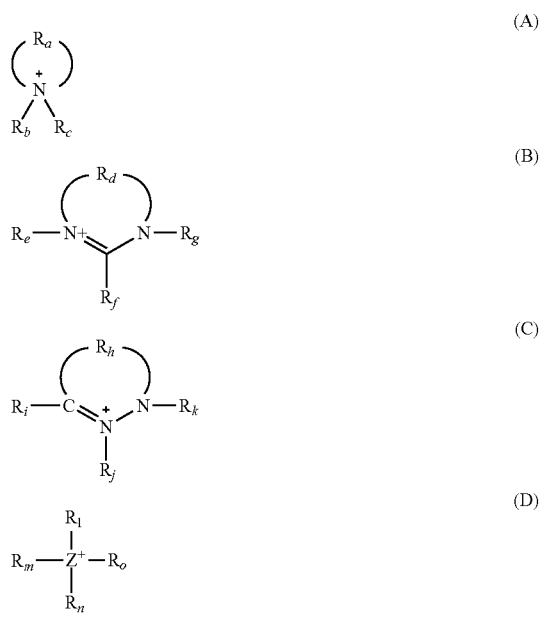

wherein:
$R_a$ represents a hydrocarbon group of a carbon number of 4 to 20, and may contain a hetero atom;
$R_b$ and $R_c$ are the same or different, and independently represent a hydrogen or a hydrocarbon group of a carbon number of 1 to 16, and may contain a hetero atom, provided that, when a nitrogen atom contains a double bond, $R_c$ is not present;
$R_d$ represents a hydrocarbon group of a carbon number of 2 to 20, and may contain a hetero atom;
$R_e$, $R_f$ and $R_g$ are the same or different, and independently represent a hydrogen or a hydrocarbon group of a carbon number of 1 to 16, and may contain a hetero atom;
$R_h$ represents a hydrocarbon group of a carbon number of 2 to 20, and may contain a hetero atom;
$R_i$, $R_j$ and $R_k$ are the same or different, and independently represent a hydrogen or a hydrocarbon group of a carbon number of 1 to 16, and may contain a hetero atom;

Z represents a nitrogen atom, a sulfur atom, or a phosphorus atom; and $R_l$, $R_m$, $R_n$ and $R_o$ are the same or different, and independently represent a hydrocarbon group of a carbon number of 1 to 20, and may contain a hetero atom, provided that, when Z is a sulfur atom, $R_o$ is not present.

4. The pressure-sensitive adhesive composition according to claim 1, wherein said ionic liquid is a water-soluble ionic liquid.

5. The pressure-sensitive adhesive composition of claim 1, further comprising a functional group-containing monomer capable of reacting with a crosslinking agent or other polymerizable monomer components.

6. The pressure-sensitive adhesive composition of claim 5, wherein the total content of functional group-containing monomer is 0.1 to 15% by weight in the total monomer components of the (meth)acryl-based polymer.

7. The pressure-sensitive adhesive composition of claim 1, wherein the glass transition temperature (Tg) of the (meth)acryl-based polymer is −100 to 0° C.

8. The pressure-sensitive adhesive composition of claim 1, further comprising a crosslinking agent, wherein the content of cross-linking agent is 0.01 to 15 parts by weight relative to 100 parts by weight of the (meth)acryl-based polymer.

9. The pressure-sensitive adhesive composition of claim 1, wherein the ionic liquid is in the liquid phase at 25° C.

10. The pressure-sensitive adhesive composition of claim 1, wherein the pressure-sensitive adhesive composition is a continuous adhesive layer.

11. A pressure-sensitive adhesive layer comprising the pressure-sensitive adhesive composition according to claim 1 crosslinked.

12. A surface protecting film characterized in that a pressure-sensitive adhesive layer comprising the pressure-sensitive adhesive composition according to claim 1 crosslinked is formed on one side or both sides of a support.

13. A surface protecting film characterized in that a pressure-sensitive adhesive layer comprising the pressure-sensitive adhesive composition according to claim 1 crosslinked is formed on one side or both sides of a support made of a plastic substrate.

14. A pressure-sensitive adhesive layer comprising a pressure-sensitive adhesive composition comprising a water-dispersible (meth)acryl-based polymer containing, as a monomer component, 50 to 99.9% by weight of a (meth)acrylate having an alkyl group with a carbon number of 1 to 14, an ionic liquid, and a functional group-containing monomer capable of reacting with a crosslinking agent or other polymerizable monomer components, wherein the water-dispersible (meth)acryl-based polymer has an acid value of 40 or less; and;

wherein the pressure-sensitive adhesive composition is crosslinked.

15. The pressure-sensitive adhesive composition of claim 14, wherein the ionic liquid is in the liquid phase at 25° C.

16. The pressure-sensitive adhesive composition of claim 14, wherein the pressure-sensitive adhesive composition is a continuous adhesive layer.

17. The pressure-sensitive adhesive composition of claim 14, wherein the water-dispersible (meth)acryl-based polymer is formed by emulsion-based polymerization.

18. A method of forming the pressure-sensitive adhesive composition of claim 1, comprising:

forming a water-dispersible (meth)acryl-based polymer containing, as a monomer component, 50 to 99.9% by weight of a (meth)acrylate having an alkyl group with a carbon number of 1 to 14 by emulsion polymerization; and combining said water-dispersible (meth)acryl-based polymer with an ionic liquid, wherein the water-dispersible (meth)acryl-based polymer has an acid value of 40 or less.

19. The method of claim 18, wherein the solid content of the resultant water-dispersible (meth)acryl-based polymer is 30-70%.

20. A method of forming the surface protecting film of claim 12, comprising applying said pressure-sensitive adhesive composition on said support without using an organic solvent.

\* \* \* \* \*